United States Patent [19]
Greenlee

[11] Patent Number: 4,621,786

[45] Date of Patent: Nov. 11, 1986

[54] CAMERA MOUNT AND PHOTOGRAPHERS SEAT

[76] Inventor: Wilfred E. Greenlee, 861 Thruston Ave., Louisville, Ky. 40217

[21] Appl. No.: 378,747

[22] Filed: May 17, 1982

[51] Int. Cl.[4] .............................................. G03B 39/00
[52] U.S. Cl. ........................................ 354/74; 354/81; 354/293; 248/123.1; 248/179
[58] Field of Search ............ 248/596, 597, 598, 123.1, 248/648, 162.1, 280.1, 292.1, 325, 334.1, 364, 79, DIG. 13; 352/243; 354/293, 74, 81

[56] References Cited

U.S. PATENT DOCUMENTS

| | | | |
|---|---|---|---|
| 3,352,521 | 11/1967 | Tyler | 248/123.1 |
| 3,402,911 | 9/1968 | O'Neill | 248/325 |
| 3,705,610 | 12/1972 | Baudras | 248/292.1 |
| 4,044,364 | 8/1977 | Prinzo | 354/74 |
| 4,206,983 | 6/1980 | Nettman et al. | 248/292.1 |
| 4,235,405 | 11/1980 | Carey | 248/123.1 |
| 4,247,067 | 1/1981 | Smith | 248/123.1 |
| 4,364,535 | 12/1982 | Itoh et al. | 248/123.1 |

Primary Examiner—William H. Schultz
Assistant Examiner—Ramon O. Ramirez
Attorney, Agent, or Firm—Edward M. Steutermann

[57] ABSTRACT

A device for mounting a camera in a vehicle subject to vibration such as a helicopter, including a base plate, a vertically upstanding cylinder adapted to receive a plunger assembly including a vertically extending shaft where the plunger is suspended within the cylinder by opposed bias forces and extends outwardly from the top of the cylinder with a fulcrum to receive a generally horizontally extending arm assembly. Bias devices are attached at one end of the arm to opposite sides of a bias member adjacent one end of the arm member and at the opposite ends to a second member to counterbalance the weight at the arm assembly and any attachments thereto and to permit pivotable movement of the arm assembly about the pivot in a generally horizontal plane and to allow the arm member to pivot vertically where the arm assembly is adapted to receive a camera at the end of the arm opposite the biasing devices and where the plunger is provided for stabilizing the camera regardless of vibration of the body of a photographer and the vehicle.

17 Claims, 13 Drawing Figures

CAMERA MOUNT AND PHOTOGRAPHERS SEAT

BACKGROUND OF THE INVENTION

The present invention relates to a freely pivotable mount which can be generally vibration free. More particularly, the present invention relates to a universal mount for continuous aiming of an instrument such as a camera at a subject which is moving, relative to the mount, where the mount may be carried in a vehicle such as a helicopter which is subject to vibration. Devices within the scope of the present invention further provide means to isolate the camera from vibrations of the photographer, the mounting mechanism and the vehicle which is carrying the camera.

In practice, it is extremely difficult for an operator to hold a camera, such as a television camera sufficiently steady to obtain pictures unblurred by involuntary movements of the operator. The problem is complicated when the operator is also required to track a moving object or when the operator is sitting or standing upon a moving, vibrating, vehicle.

In various applications different weight cameras are utilized so that means must be provided to accommodate different cameras with a single mounting system. The prior art illustrates various types of camera mounts to hold a camera steady while affording means for moving the camera to track a moving object.

Prior art examples intended to provide vibration free camera mounting devices are shown in U.S. Pat. No. 3,352,521-Tyler and U.S. Pat. No. 4,206,983-Mett, et al.

Another mounting system for cameras is shown at page 181 of Millimeter Magazine of August 1981.

No prior art reference is known which provides a support means to be attached to a base where biased support arm means are provided to maintain a camera in a fixed position at rest and to allow freedom of movement up and down and sideways while eliminating vibration of the camera as a result of vibration to which the camera is attached and to isolate the camera from the vibration of the photographer or the vehicle carrying the camera and the photographer.

SUMMARY OF THE INVENTION

The present invention provides a new and useful mounting arrangement for an object such as a camera to eliminate transmission of vibration to the camera from the base to which the mounting arrangement is secured where the base may be subject to vibration. More particularly, camera mounting arrangements within the scope of the present invention include bias means to eliminate vibration of the camera as the base or the operator of the camera move or are moved, for example by vibration of the vehicle to which the base is secured.

Devices within the scope of the present invention further eliminate bulky counterbalances used in prior art arrangements and thereby to afford freedom of movement unavailable with various prior art arrangements.

Further devices in accordance with the present invention are of substantially less weight than prior art devices and provide substantial advantage when utilized in aircraft.

Moreover, devices within the scope of the present invention can include biased shock absorbers with compression and recoil system to support a camera and which cooperate to provide a system which effectively allows freedom of movement unavailable in any prior art Camera mount.

Moreover, devices within the scope of the present invention provide seating means for a photographer in using devices within the scope of the present invention where the seating means are adapted to accommodate the movements and positions of the photographer utilizing the camera.

Devices within the scope of the present invention can be provided to permit location of the camera on either side of a central support so that the camera can be directed from either side of a moving vehicle by a simple readjustment of the assembly.

The present invention provides universal camera mounts in which the mass of the mounted instrument is balanced about its various axis of movement, yet allows the operator to easily and quickly change the position of the camera or to quickly and easily change cameras where the cameras may have different weights.

Further devices within the scope of the present invention can be constructed so that the system is isolated from metal to metal contact with a vehicle carrying the device and such isolation prevents transmission of movement and vibration of the vehicle to the system so steady and crisp performance is achieved.

More particularly, the present invention provides a device for mounting a camera in a vehicle subject to vibration such as a helicopter, including a base plate, a vertically upstanding cylinder adapted to receive a plunger assembly including a vertically extending shaft where the plunger is suspended within the cylinder by opposed bias forces and extends outwardly from the top of the cylinder with a fulcrum to receive a generally horizontally extending arm assembly. Bias devices are attached at one end of the arm to opposite sides of a bias member adjacent one end of the arm member and at the opposite ends to a second member to counterbalance the weight at the arm assembly and any attachments thereto and to permit pivotable movement of the arm assembly about the pivot in a generally horizontal plane and to allow the arm member to pivot vertically where the arm assembly is adapted to receive a camera at the end of the arm opposite the biasing devices and where the plunger is provided for stabilizing the camera regardless of vibration of the body of a photographer and the vehicle.

Various arrangements can be provided within the scope of the present invention and several such arrangements are shown in the accompanying drawings which are not presented for purposes of limitation but merely as illustrative of examples of arrangements within the scope of the present invention.

BRIEF DESCRIPTION OF THE DRAWINGS

The accompanying Figures illustrates examples within the scope of the present invention and are not presented by way of limitation. In the accompanying drawings.

DETAILED DESCRIPTION OF THE DRAWINGS

Figures 1, 1A:
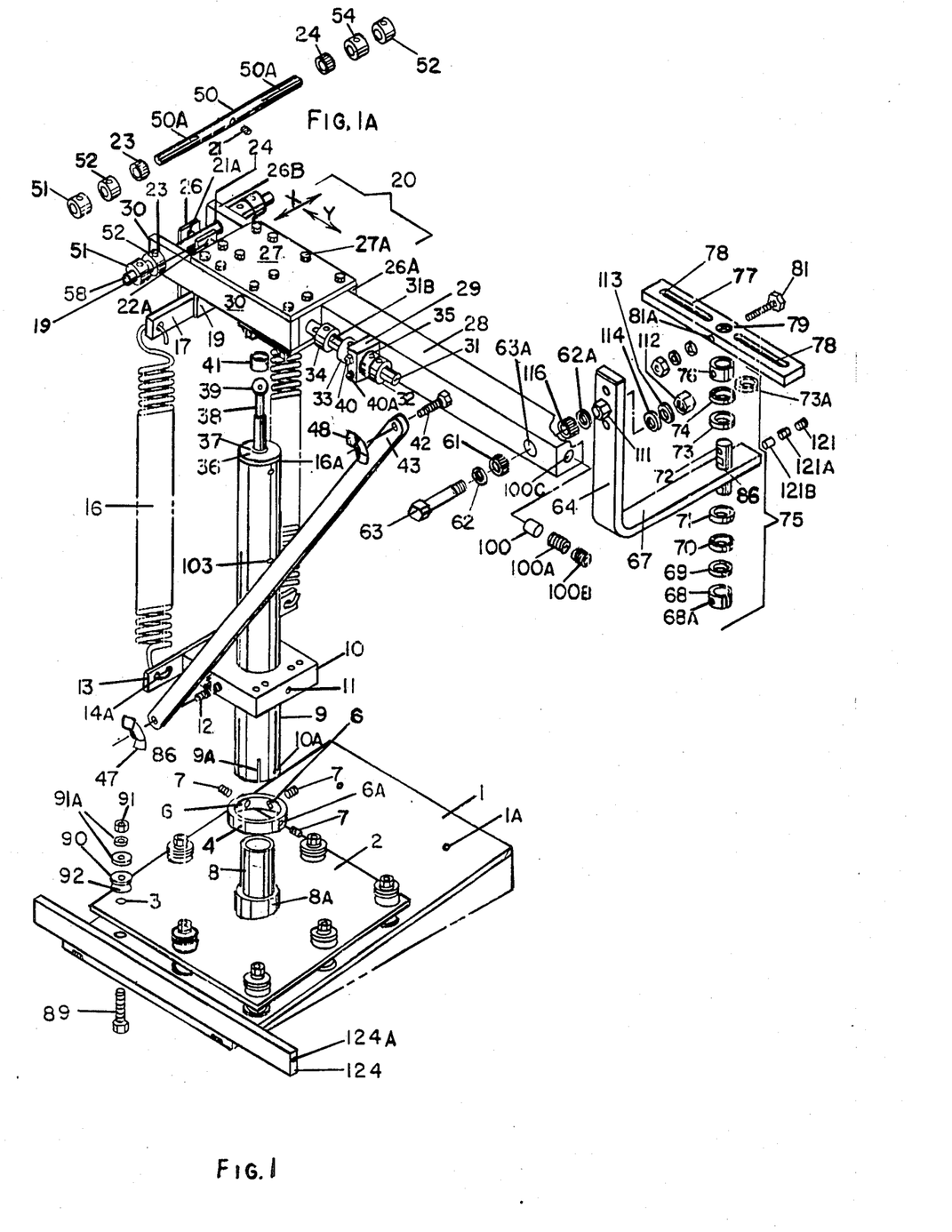
FIG. 1 is a perspective illustration of one arrangement within the scope of the present invention.
FIG. 1A is one exploded view of a portion of the device of FIG. 1.

Referring first to FIG. 1 which presents a perspective view of one example of a mounting arrangement within the scope of the present invention. FIGS. 1-4 illustrate a mounting arrangement for use from the right hand door of a vehicle. However it will be understood that the present invention includes arrangements for left handed door use which are mirror images of the right hand door mount arrangement. In FIG. 1 an isomount plate 2 is provided for attachment to a plate 1 which is connected to a vehicle, for example a helicopter. As described hereinafter isomount plate 2 can be adapted to movably mount a camera support system but, in the case of helicopters, can advantageously be left on board when the system is removed and the vehicle is used for other purposes.

While devices within the scope of the present invention can be utilized in many vehicles, for purposes of illustration mounting in a helicopter will be illustrated. Plate 1 can be attached to the vehicle and is provided to support isomount plate 2 and securely fasten the system to the vehicle. A support bar 124 can be provided to be attached to the vehicle fuselage to, for example, seat belt lugs to provide support for the system.

While not always discussed, it will be understood that all nuts and bolts are secured with lock washers and flat washers.

As described hereinafter, isomount plate 2 may be mounted at an angle with respect to plate 1 or may be parallel to the surface depending upon the vehicle configuration and normal orientation but column 9 is generally vertically oriented. Also isomount plate 2 can be mounted on plate 1 with vibration absorbing devices as described hereinafter. Isomount plate 2 is provided with a post 8 for mounting the device as described hereinafter and includes an enlarged shoulder 8A to support the end of hollow column 9 as shown in FIG. 2.

As shown, base 2 can be connected to surface 1 by means of bolts 89 which are provided with isomount pads 92, as is known in the art and described hereinafter. While various numbers of isomounts may be provided in the arrangement shown, 8 isomounts are shown.

Figure 2:
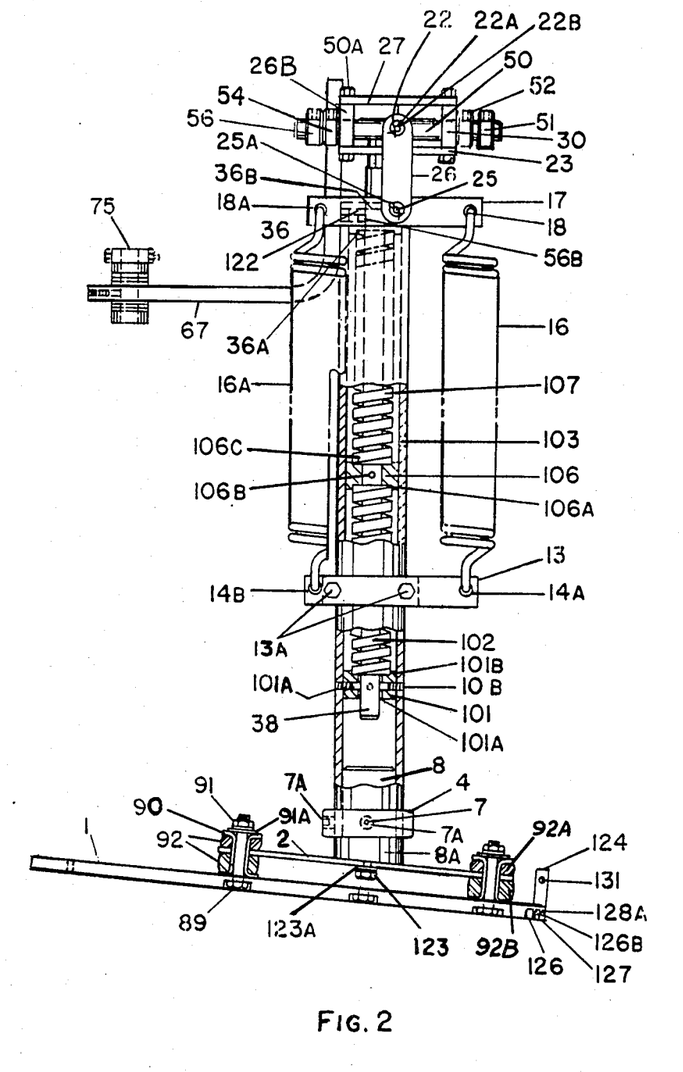
FIG. 2 is a rear view of the arrangement shown in FIG. 1.

As shown in FIG. 2 isomount 92 include divided inserts 90 and are retained by bolts 89 with nuts 91 and flat and lock washers 91A so that vibration of plate 1 is absorbed before transmission to plate 2.

A collar 4 is provided to be received on post 8 with tapped and threaded apertures 6, 90 degrees apart to receive set screws 7. A pin 7A is provided to be received in cooperative apertures (not shown) in column 9 and post 8 to secure the post and column in fixed relation and facilitate removal. Slots 9A are provided in column 9 to facilitate tightening of column 9 in post 8 and in FIG. 1 the length of the slots is exaggerated for purposes of clarity. Collar 4 is adapted to receive column 9 and retain the column on post 8 in a generally vertically extending position from base 2. A piston shaft 38 is provided to be received in column 9 and extends outwardly from the top of column 9 through aperture 37 of a shaft guide 36, as described hereinafter, and carries a fulcrum ball 39 which is received in a fulcrum cup 41. Cup 41 is retained, as described hereinafter, in a three dimensional pivot assembly 20 including a top plate cover 27 secured to opposite side plates 30 and 26 by means of machine bolts 27A and a bottom plate (not shown).

Figure 1B:
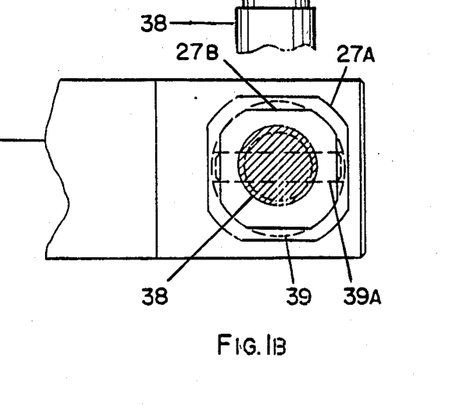
FIG. 1B is an enlarged bottom view of the socket receiver of the vertical column of the device of FIG. 1.

Cup 41, as shown schematically in FIG. 1B has a recess 41B to receive ball 39. Cup 41 is received in a socket 27B of for example, by presss fitting. Arm 28 is also shown in FIG. 1B. Retainers 27A are provided at the bottom of socket 27B to prevent escape of fulcrum ball 39. The unit is assembled by inserting rod 38 through socket 27B as shown, pinning ball 39 to shaft 38 by means of a pin 39A and locating ball 39 in socket 27B and inserting cup 41 in place on top. This secures ball 39 to arm 28 but allows a large degree of pivotal movement.

In the arrangement shown, assembly 20 is adapted to slide on arm 28 for relative adjustment of the three dimensional fulcrum point provided by cup 41 and ball 39 relative to the weight of the camera carried by the device all as described hereinafter.

As previously discussed the invention provides means to satisfactorily counter-balance the weight of a camera or of different weight cameras carried at the end of arm 28 as described hereinafter. To accomplish this objective assembly 20 is adapted to receive 2 fulcrum position adjustment shafts, namely shaft 31, as shown at one side of arm 28 which is secured to assembly 20. A second adjustment shaft 50 is provided at the rear of assembly 20 and is journaled by aligned cooperative apertures in side plates 26 and 30. Needle bearings 23 and 24 can be provided within the cooperative openings provided in sides 26 and 30 to facilitate movement of shaft 50 as described hereinafter.

Figures 1C, 3:
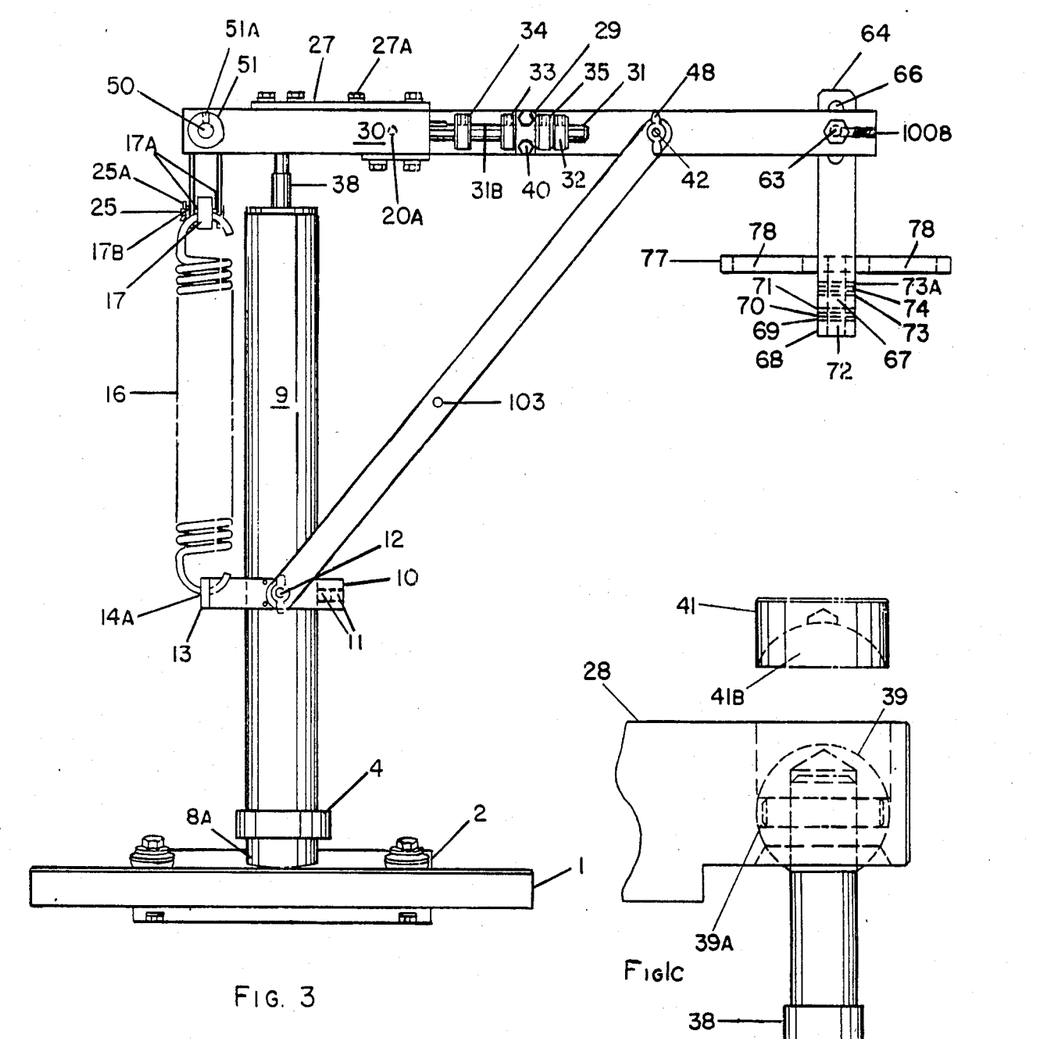
FIG. 1C is a side view of the socket and connector of the post and arm shown in FIG. 1.
FIG. 3 is a side view of the arrangement shown in FIG. 1.

With respect to shaft 31, collars 32, 33, 34, and 35, as shown in FIG. 3, are provided to be selectively positioned on shaft 31 by means of co-operative set screws as indicated to adjust the counterbalancing force to be available to arm 28 in a first direction as described hereinafter.

In operation as described hereinafter, the outer collars 32 and 34 can be preset to accommodate the maximum intended weight ranges. The inner collars 30 and 33 are selectively moved against a stop 29 in response to movement of assembly 20 when the weight to be carried on bracket 77 described hereinafter is changed.

Stop 29 is secured to arm 28 by means of machine bolts 40 to selectively limit the movement of collars 33 and 34. Collars 31, 32, 33, 34 can be secured by means of set screws as shown and in this regard a cooperative flat bearing surface 31B can be provided on shaft 31 to facilitate placement of the collars.

An exploded view of adjustment shaft 50 is shown in FIG. 1A to illustrate that shaft 50 includes a flat surface 50A where set screws are provided so collars 51, 52,54, 56 can be secured to shaft 50 and the set screws are received on flat bearing surfaces 50A.

With respect to shaft 50, the shaft is provided to adjust counterbalance in the axes as shown in FIG. 1. As with collars 32-35 the outer collars 51, 52 can be preset for the maximum weight range and collars 52, 54 then set to counterbalance the exact weight.

Figure 4:
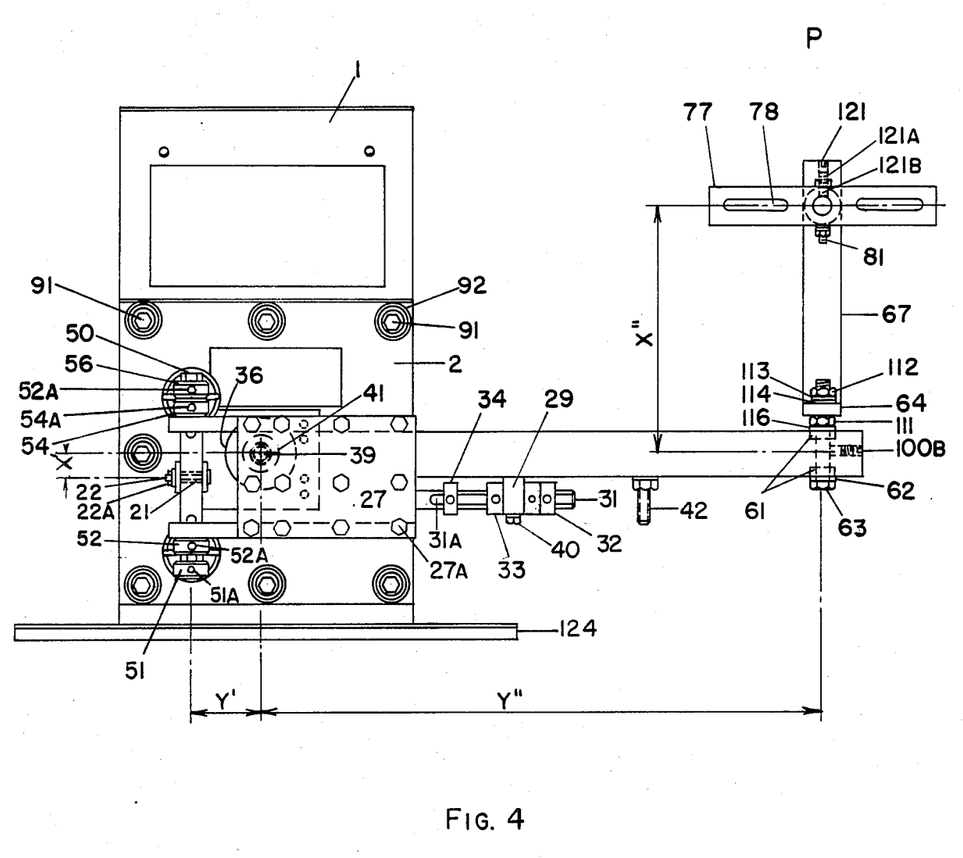
FIG. 4 is a plan view of the arrangement shown in FIG. 1.

Connectors 19 and 26 are provided on opposite sides of adjustment shaft 50 between side plates 26B and 30 and connected to shaft 50 by a pin 22 extending through the connectors and shaft 50 to provide a stress point for application of counterbalance forces later described. Needle bearing 21 (FIG. 4) can be provided within an aperture of shaft 50 to receive pin 22 to facilitate movement of pin 22 and connectors 19 and 26 with respect to shaft 50 where pin 22 can be secured by a cotter pin 22A backed by a washer 22B (FIGS. 2 and 4).

A spring pressure equalizing bar 17 is provided and connected between connectors 19 and 26 by means of a pin assembly 25 (FIG. 2) and can be secured, for example, by means of a cotter pin 25A. A pair of spacers 17A are provided on each side of bar 17 between the bar and connectors 26 and 19. A facing washer 17B is provided between pin 25A and connector 26. As shown in FIG. 2 pressure equalizing bar 17 is provided with 2 apertures 18 and 18A to receive ends of springs 16, 16A, which as described hereinafter are utilized to counterbalance the weight of a camera in X and Y axes as also described hereinafter. The opposite ends of springs 16, 16A as shown in FIGS. 1 and 2 are connected through apertures 14A, 14B of a spring anchor 13 which is secured by bolts 13A to a spring anchor block 10 carried by central column 9. Spring anchor block 10 is secured to column 9 by means of set screws 11 as provided in FIG. 1. It will be understood that 2 set screws 11 can be provided, one backing the other to prevent movement of block 10. The setting of block 10 on column 9 adjusts the overall spring tension proivded by springs 16,16A.

CAMERA MOUNTING BRACKET

FIG. 1 shows an exploded view of an example of a camera mounting bracket within the scope of the present invention to mount a camera to the end of arm 28. A bracket 64 having a laterally extending leg 67 is provided with apertures 66 to receive a bolt 63. Needle bearings 61, 116 can be provided on opposite sides of arm 28 to be received in cooperative sockets of arm 28 and a washer 62 can be provided between the cap of bolt 63 and arm 28. On the opposite side of arm 28 a nut 11 is provided to secure bolt 63 and needle bearings 61 with a washer 62A between nut 111 and bearing 116 in place. Bracket 64 is then secured to bolt 63 by means of a nut 112 with a bearing race 114 and washer 113 therebetween (FIG. 4). A drilled topped hole 100C is provided at the end of the arm 28 and communicative with the cross drilled hole receiving bolt 63A. A bearing 100 is provided to be received in aperture 100C and backed with a spring 100A where a set screw 100B is received in aperture 100C to adjust the force applied by bearing 100 to the side of bolt 63 and to restrain, but not prevent, rotation of bolt 63.

A camera mount post assembly 75 is secured to leg 67 of bracket 64 as shown. Assembly 75 includes a post 72 received in a bushing 86 in bracket 67 where rollers 71, 69 are provided on opposite sides of a bearing 70 on the bottom side of post 72 (which is received through an aperture 86 of arm 67) and secured thereto by a collar 68 by means of a set screw 68A.

On the upper side of post 72 a bearing 74 is provided with races 73 on either side. The arrangement has been found to prevent binding when the camera (not shown) is mounted on bracket 77 and turned on the movement, as for example when the assembly is tilted 45 degrees. The bearing 74 and 70 prevent binding of post 72 against bushing 86.

On the upper side of arm 67 a bearing 74 is provided with races 73 on either side and secured by means of a collar 76 secured to post 72 by means of a set screw (not shown).

A camera bracket 77 is provided having slots 78 for mounting a camera and a central aperture 79 to receive post 72. A bolt 81 is provided to be received through a cooperative aperture 81A in the side of a bracket 77 to secure bracket 77 to post 72. Advantageously as shown in FIG. 4 a spring 121A can be provided in a drilled and threaded aperture in the end of arm 67 with a set screw 121 received on top thereof to urge a bearing 121B against post 72 to adjust the force for rotation of shaft 72 and bracket 77 with a camera (not shown) in position on bracket 77.

COLUMN ASSEMBLY

As previously described column 9 is provided to be received on post 8 to provide a central support to the fulcrum shaft 38 and the fulcrum ball 38 which is received in cup 41 and retained in arm 28. Advantageously column assembly 9 provides a dynamic, balanced support for arm 28 to eliminate the transmission of vibration from vehicle surface 1 to the camera carried on bracket 67. In order to accomplish this objective in the example shown in the Figures a spring biased arrangement is provided. However, it will be understood that in appropriate circumstances a pneumatic or other balance system°could be provided within the scope of the present invention and that within the scope of the present invention the column could be fixed.

More particularly, referring to FIG. 2, a shaft guide 101 is provided to be located in column 9 and having a bushing, for example a bronze bushing 101A to provide a bearing surface for shaft 38. Apertures 10B are provided in column 9 to allow insertion of roll pins 10A in cooperative apertures of guide 101 to secure guide 101 within column 9 at a desired location.

A spring 102 is provided to engage a recess 101B in the upper surface of guide 101 and to engage a recess 106A in the lower side of a piston 106 which is secured to shaft 38, for example, by means of a roll pins 106B, for example 4 such pins at 90 degree intervals. Piston 106 is initially secured to shaft 38 by moving shaft 38 to position piston 106 in aligned relation with apertures 103 provided in column 9 as shown in FIGS. 1 and 2 and inserting roll pin 106B when shaft 38 is in aligned position with the apertures 103. Piston 106 is provided to retain springs 102 and 107 to provide an assembly to absorb vibrations and shock to prevent unwanted movement of bracket 77 where the camera is to be mounted.

A recoil spring 107 is received in an upper recess 106C of piston 106 and extends upwardly from piston 106 surrounding shaft 38 and received in recess 36A of upper fulcrum shaft guide 36 so that spring 107 is in slight compression between guide 36 and piston 106 while compression spring 102 is in slight compression between piston 106 and guide 101 to thereby preload the springs during assembly to enhance smooth operation and to accommodate forces exerted by springs 16, 16A when the unit is fully assembled and compression of spring 107 has been partially relieved.

A bushing for example a bronze bushing 36B can be provided in upper guide 36 to provide a bearing surface for shaft 38. Roll pins 122 can be provided to secure guide 36 within column 9 as shown, for example at 90 degree intervals.

BASE PLATE MOUNTING

As shown in FIG. 2 base 2 is mounted to a surface 1 by means of an elastomeric isomount assemblies including upper compressive fittings 92A, lower compressive fittings 92B and a connecting pin, for example a machine bolt 89 which is secured by means of a nut 91 to surface 1 and suspends base 2 between the elastomeric isomounts; inserts 90 can be provided with mounts 92 as shown. Thus base 2 floats between the slightly compressed isomount fittings 92A and 92B to prevent transmission of vibrations from surface 1 to base 2 and the camera assembly previously described. The support assembly is held in place on base 2 by means of 4 bolts 123 which secure post 8 (FIG. 1) which extends vertically upwardly from base 2. Flat and lock washers 123A can be provided for bolt 123. In the example of FIG. 2 base 2 is adapted to accommodate an angular slant of surface 1 relative to horizontal to permit column 9 to be perpendicular to ground surface when in flight. As previously described collar 4 is provided to secure column 9 to post 8.

In normal operation a photographers seat as described hereinafter would be located generally in the area designated "P" in FIG. 4 and in the case of helicopter mounting, the photographer would normally have his feet located on a support 166 described hereinafter.

As shown in FIG. 1 a safety bar 43 can be provided to be secured between bolt 42 on arm 28 by means of a wingnut 28 and bolt 12 on block 10 by means of a nut 47. When not in use the bar 43 is secured to bolt 12. Bolt 43 is utilized to prevent relative movement of arm 27 with respect to column 9 as a result of the loading provided by spring 16, 16A when the camera is removed from the mounting bar 77.

OPERATION

Devices within the scope of the present invention, as previously described, are intended to provide counterbalancing and ease and freedom of movement of a camera in three dimensions where the weight of the camera, whether light or heavy is fully balanced. In this regard, discussion is directed to the X and Y axes as illustrated in FIG. 1 where generally the XY axes can be considered to be in the same plane, which can be a plane parallel to arm 28 and not necessarily horizonal plane. The device further provides relative ease of movement of the camera in a axis which is generally the vertical axis.

Referring to FIG. 4 the aspect of counter balancing in the Y axis is illustrated by the reference letters $Y'$ and $Y''$ which designate moment arms. The distance $Y'$ is the moment arm from the fulcrum ball 39 to the center of shaft 50 where springs 16 and 16A are attached by means of connectors 19 and 21. Springs 16 and 16A provide, in terms of FIG. 3 a counter clockwise moment about fulcrum ball 39 while the weight of arm 28, arm 67 and the camera (not shown) carried on bracket 77 provides the clockwise moment along with the distance $Y''$ to counterbalance the counterclock wise moment.

Likewise in the X axis the distance $X'$ represents the counterbalancing moment provided by the tension of spring 16 as applied over the moment arm $X'$ which counterbalances the moment arm of the weight of the camera applied over the moment arm $X''$.

The relative $X'-X''$ and $Y'-Y''$ distance are determined by the weight of the camera to be fastened to bracket 77. The purpose is to exactly counterbalance arm 28 in a stable horizontal position yet leave the camera in condition for easy smooth movement by the photographer. The collars 32, 34 and 51, 52 can be set to accommodate a maximum weight camera while the lower limit can be field adjusted by movement of collars 33, 35 and 52,54 where the $X'$ and $Y'$ distances are increased or decreased in proportion to change in weight of the camera.

Referring to FIGS. 1 and 4 the moment arm $Y'$ is adjusted by movement of the collars 33, 35 with respect to stop 29. That is in order to adjust the moment arm $Y'$, for example for a heavier camera the moment $Y'$ is increased by loosing collar 33 and moving assembly 20 appropriately. Likewise with respect to the $X'$ moment arm which adjusts the balancing of the weight of the camera over the movement arm $X'$ the collars 51, 52, 54 and 56 are adjusted on shaft 50 to shift the relative point of exertion of the force of springs 16, 16A relative to fulcrum ball 39 to appropriately adjust the moment arm exerted to counterbalance the weight of the camera.

Additionally it will be understood that while in FIGS. 1–4 an arrangement is shown which can be termed a right hand set up determined by the position of the camera relative to the photographer, other arrangements also within the scope of the present invention can be utilized. FIGS. 5–8 illustrate a combination mount also within the scope of the present invention where the unit can be switched between the left hand and right hand mounting, for example to operate from either the left hand or right hand of the vehicle. The important aspects of the arrangements shown in FIGS. 5–8 will be designated with the numerals corresponding to those used in FIGS. 1–4 but it will be understood that the features previously discussed with respect to FIGS. 1–4 can be incorporated in the arrangements as shown in the FIGS. 5–8.

Figure 5:
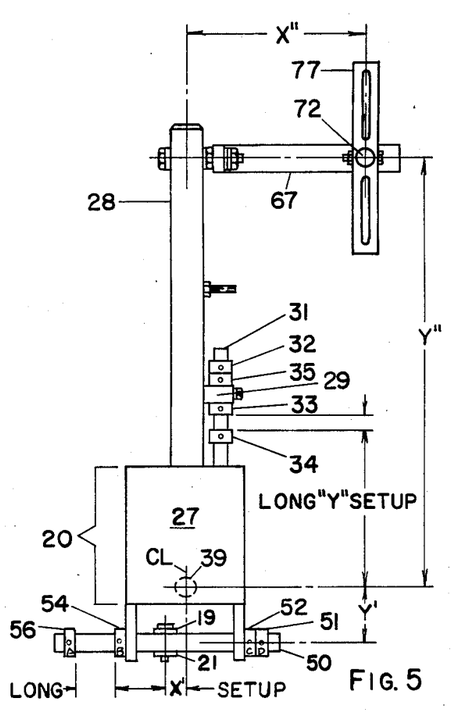
FIG. 5 is a plan view of an arrangement within the scope of the present invention for mounting a camera on a first side of a mount.

In FIG. 5 an arrangement is illustrated for a left hand door set up, as opposed to the right hand door set up illustrated in FIGS. 1–4. In FIG. 5 assembly 20 is illustrated and the arrangement is for a left hand door set up of a heavy camera. The position of collars 51–52 on shaft 50 will be noted as well as the spacing between the collars 54–56 to accomplish the necessary counter balancing in the X moment arm. Further it will be noted that stress point of shaft 50 and the $X''$ moment arm is to the left of the center line CL of the fulcrum ball because the bracket mount 67 and the camera mount bracket 77 are to the right side of fulcrum 39. With respect to the Y axis the collars 32, 35 are in the position shown with the collars 33 and 35 secured against the stop 29.

Figure 6:
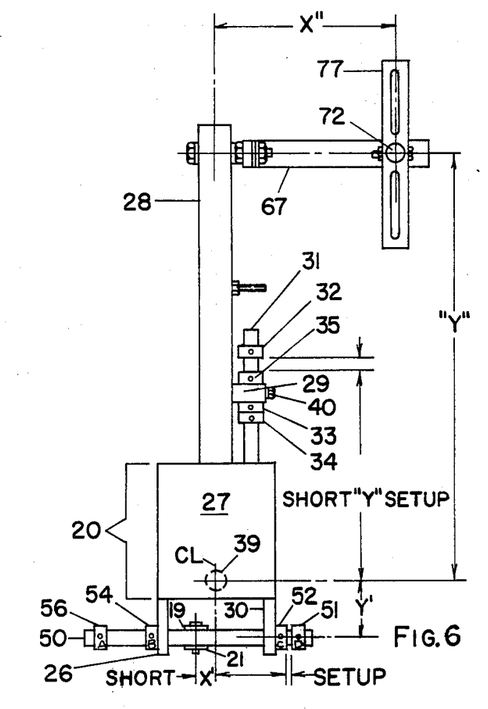
FIG. 6 is another view of the arrangement of FIG. 5.

By way of illustration in FIG. 6 which is a left hand set up for a lighter weight camera it will be noted that shaft 50 (and brackets 19 and 21) have been shifted to the right in comparison to the position in FIG. 5 to provide a lesser moment $X'$ arm about the fulcrum point 39. The moment arm $X'$ is shown which counterbalances the moment arm $X''$ where the spring equivalent to spring 16A would be utilized to counter balance the weight of the camera on bracket 77. Likewise assembly 20 has been moved by adjustment of collars 32, 33, 34, 35 to decrease the moment arm Y' in comparison with the Y' dimension in FIG. 5.

Figure 7:
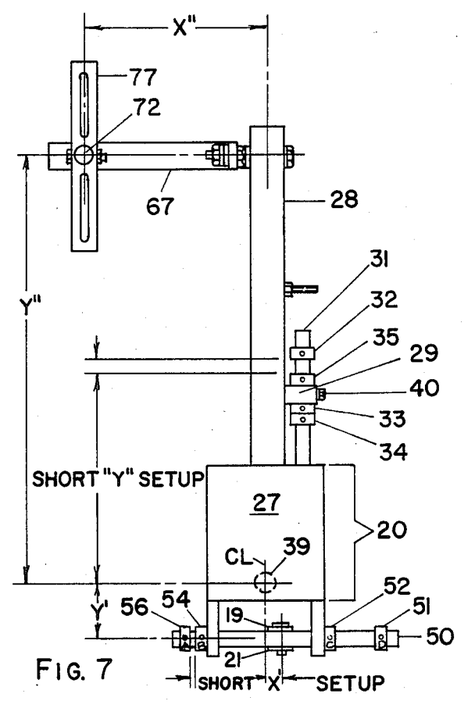
FIG. 7 is another view of an arrangement within the scope of the present invention for mounting a camera on a second side of a mount.
Figure 8:
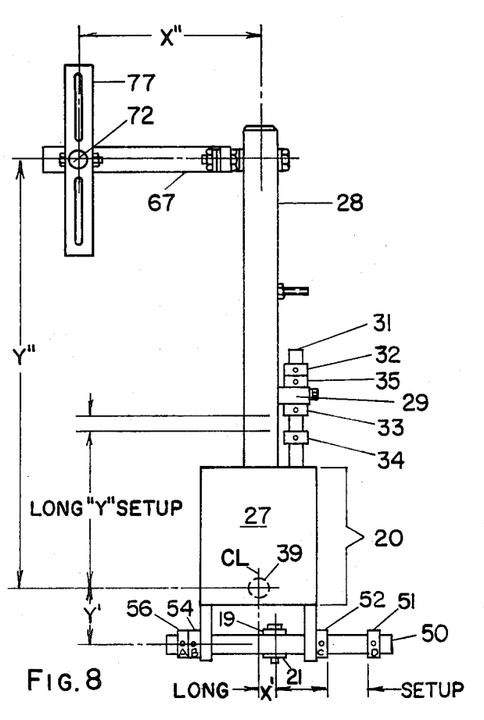
FIG. 8 is another view of the arrangement of FIG. 7.

FIG. 7 is an illustration of a right hand door setup, similar to the arrangement shown in FIGS. 1-4 where the camera bracket 77 is to the left of arm 28 so that the moment arm X' extends from fulcrum 39 to the right and the counter balancing moment arm X" extends from the fulcrum 39 to the left to the stress point as shown to the stress point of shaft 50. In this arrangement the collars 56, 54 are positioned for a light weight camera so X" is less than the maximum. It will be noted that as far as the Y axis is concerned the position of the collars 32, 35, 33 and 34 is the same as in FIG. 6 for the lighter camera with the left hand mount. Accordingly it can be seen that the adjustment in the Y axis is to accommodate only the moment arm created by the weight of the camera exerted along the Y axis while the shift from side to side that is from left hand to right hand mount requires a shift of the connectors 19 and 26 from one side to the other of the fulcrum 39 with a corresponding shift of bracket 13. FIG. 8 is an illustration of an arrangement of a right hand set up for a heavier camera where it can be seen that the collars 56, 54 have been moved as shown as has the collar 52 to provide a greater X' moment arm.

Figure 9:
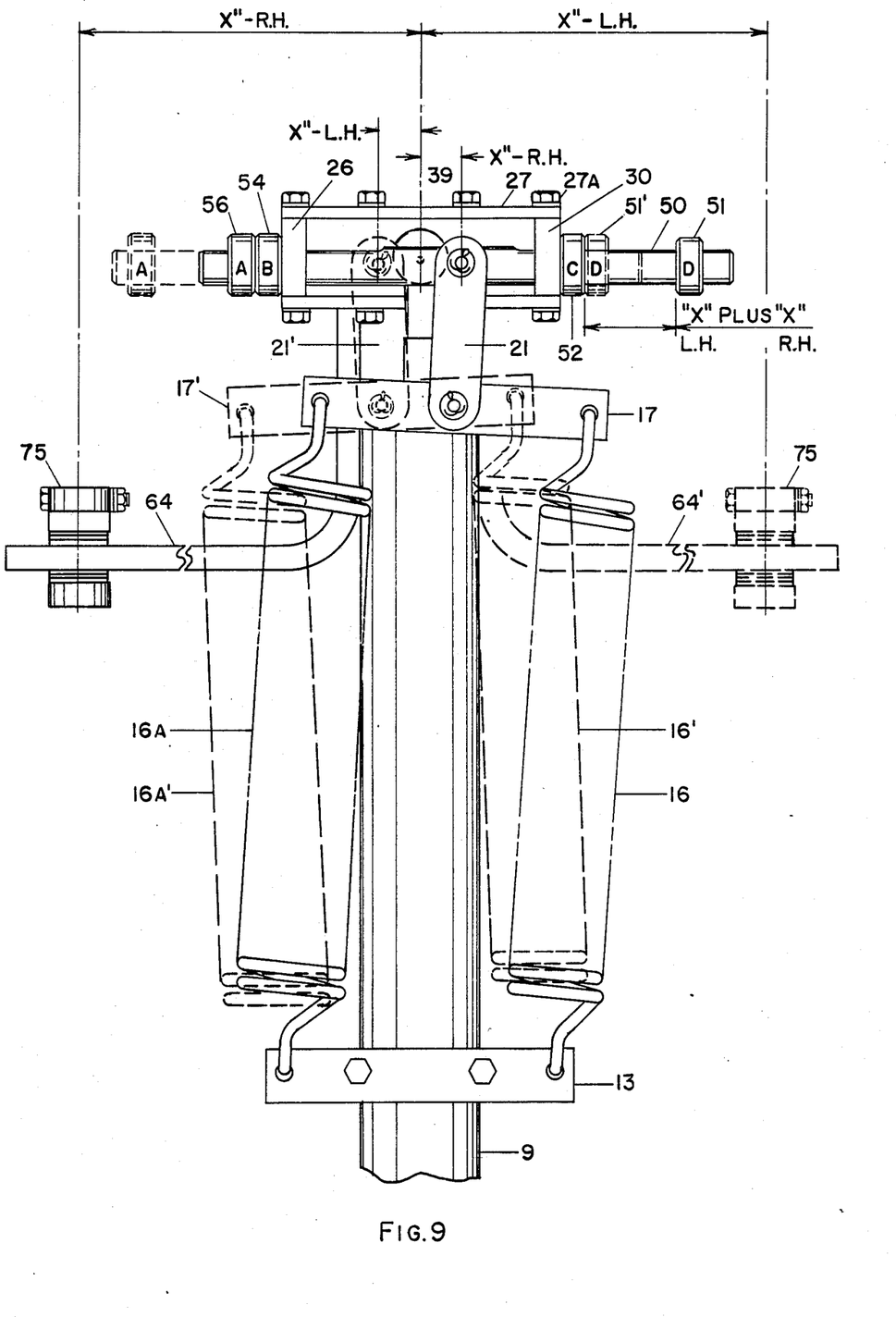
FIG. 9 is a rear view of a device within the scope of the present invention illustrating a device for mounting a camera on either side of a mounting arrangement.

FIG. 9 is an illustration of a combination arrangement useful for left hand and right door mounting similar to the illustration of FIG. 2 except that the adaptation for left hand mounts is shown in dotted line where springs 16A' and 16' are illustrated connected to bracket 17', which is connected to brackets 21' and 18 (not shown) which have been moved to the left of the fulcrum ball 39 in order to accommodate bracket 64' extending to the right hand side of column 9. Thus it can be seen that with a simple adjustment provided in FIG. 9 a combination unit can be provided to accommodate left hand or right hand mounts.

Figures 10, 11:
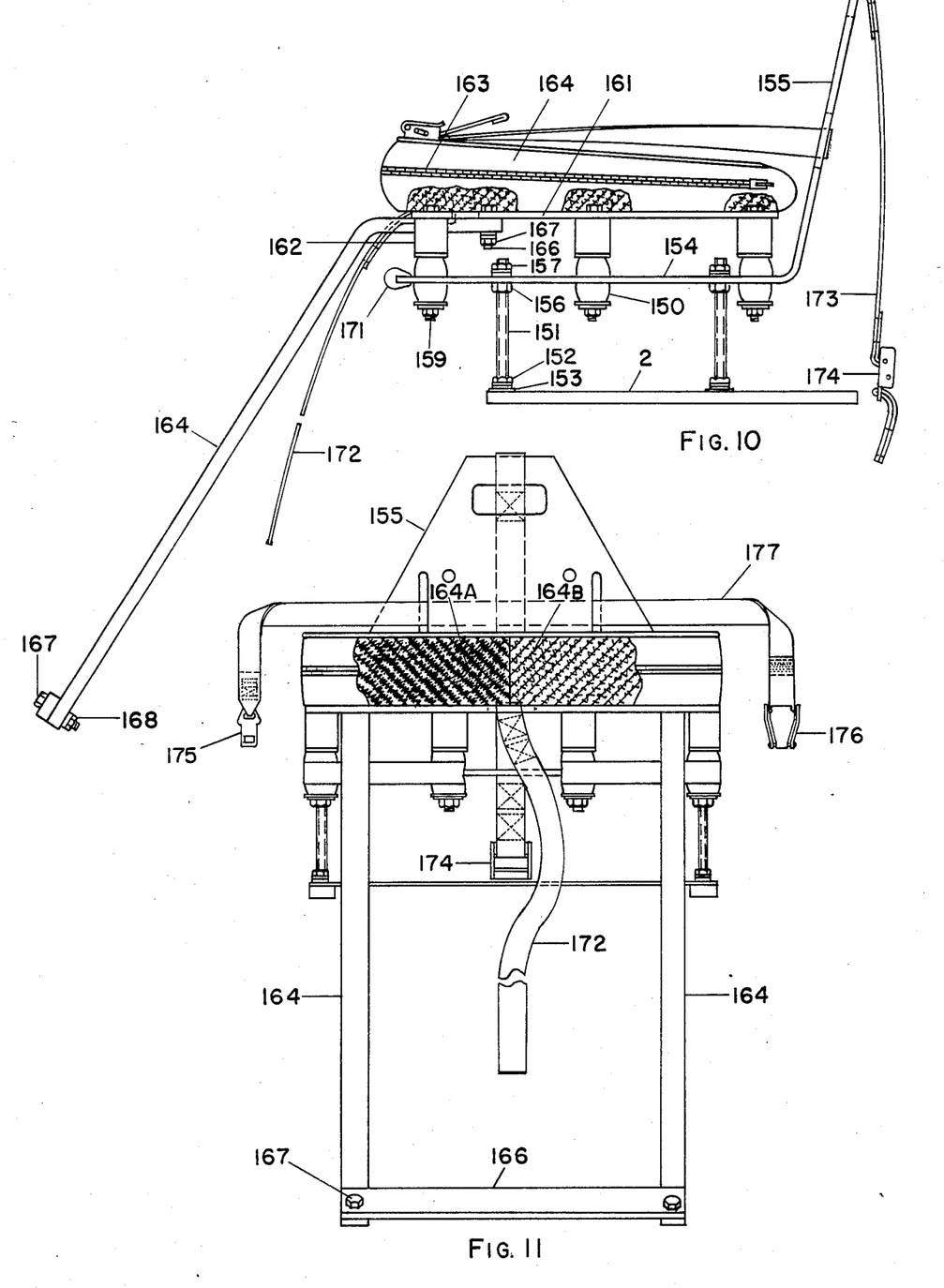
FIG. 10 is a side view of a photographer's seat within the scope of the present invention.
FIG. 11 is a front view of the seat arrangement shown in FIG. 10.

FIG. 10 is an illustration of a seat within the scope of the present invention useful in the arrangement previously described. In the arrangement shown in FIG. 10 the seat as described hereinafter is attached to a base 160, for example strapped to the floorboard of a vehicle. Legs 151 are secured to base 2 by means of nuts 152 with lock and flat washers 153. A plate 154 is connected to legs 151 by means of nuts 156, 157 where it will be understood that additional legs and connectors can be provided connecting plate 154 to base 2. Isomounts 158 are provided (as previously described with respect to base 2 to connect base 2 to the vehicle surface 1) and carry bolts 159 to connect plate 154 to the seat plate 161. Spacers 162 can be provided between the top of isomounts 158 and seat plate 161 as shown.

As shown in FIGS. 10 and 11 a zipper 163 is provided around seat 164 which is padded as described hereinafter. Plate 154 can be provided with an extension 155 to, for example, secure straps to support the seat and to prevent tilting of base 160. A footrest including supports 164 is provided connected to a seat footrest 166 and connected to the opposite end to plate 161 by means of bolts 166 with nuts 167. Footrest 166 is connected to supports 164 by means of bolts 167 secured by nuts 168 which include flat and lock washers 168A.

Within the scope of the present invention the padding provided in seat 164 can be adjusted to accommodate the angle or the force of exertion of the photographer on the seat. In this regard, for a right hand mount a padding 164A of high density is provided on one side of the seat and padding 164B of lower density is provided on the other side of the seat. In a left hand door mount arrangement the denser and lighter padding would of course be interchanged.

The zipper arrangement is provided to allow the denser and lighter padding to be reversed when the camera mount is switched from left hand to right hand mount. It has been found that this feature allows the photographer to move relative perpendicular to horizontal when in flight.

Additionally, a protective bumper 171 can be provided around the edge of plate 154.

Devices within the scope of the present invention can initially be set for camera weight ranges or can be field adjusted. The initial adjustment is accomplished by the positioning block 10 on column 9 to adjust the tnesion of springs 16 and 16A to accommodate the range of camera weights to be utilized. The device can then be quickly changed from counterbalancing a heavier camera to a lighter camera by simply changing the position of assembly 20 and shaft 51 where, as previously described assembly 20 provided the Y' counterbalance and shaft 50 which carries the connectors 19,21 provides the moment arm X' to counterbalance. The adjustment is accomplished by means of the adjustment of collars 32-35 on shaft 31 and collars 51, 52, 54, 56 are provided to adjust the position of shaft 50.

The tension of spring 16, 16A is set to counterbalance a heavier and lighter weight as previously described. To set the device for the lighter weight camera, the camera is placed on bracket 77 and collars 35 and 33 are then loosened and the arm 28 is moved to a horizontal position. Collars 35 and 33 are then adjusted against stop 29. It will be understood that collars 34 and 32 have been preset to accommodate a range between a higher and lower weight cameras. Likewise with respect to shaft 50, collars 51 and 56 have been preset to accommodate the higher and lower weights. The collars 54-52 are then loosened and shaft 50 carrying connectors 19 and 21 are moved until the assembly 20 is in a horizontal position at which time collars 54 and 52 are tightened. To accommodate a heavier camera the same procedure is generally followed.

With respect to the combination arrangement shown in FIGS. 5-9 the outer collars 51-56 and 34-32 may or may not be preset to accommodate both left hand and right hand mounts. Generally the same procedure is utilized except that in switching from left hand to right hand mount it is necessary to make appropriate adjustments for the collars 51-56 and 34-32. However, in either case the X' distance counteracts the leverage applied by the moment arm X" with the camera mounted on bracket 77 and the distance Y' counters the leverage applied by the moment arm Y" with a camera mounted on bracket 77. The collars are then set to accommodate the weight of the camera. One example of the procedure will be discussed. For example referring to FIG. 7 to change the mechanism from a lightweight setting to a heavyweight setting the safety bar is removed from the storage pin 12 and secured in position on bolts 42 and 12. The lighterweight camera would then be removed from bracket 77. If the device had previously been set up for left use and is to be utilized for right hand use as shown in FIG. 7 bracket 67 would be removed from arm 28 and reassembled as shown in FIG. 7. The heaverweight camera would be attached to bracket 77 and collars 54, 52, 33 and 35 loosened. With the camera and arm 28 held the safety bar would be removed and arm 28 raised to snap collars 35 and 32 tight against adjustment stop 29. The arm 28 would then be lowered until level. The arm 28 would then be rotated counterclockwise until shaft 50 including connects 19 and 21 urges collars 56 and 54 against sideplate 26. The safety bar 43 would then be reset on bolts 42 and 12 and collar 33 moved against stop 29 at which time collars 33 and 35 would be secured to shaft 31. At this point collars 54 and 52 would be secured. The safety bar is then removed and the assembly is ready for use. It will be understood that similar procedures would be followed in connection with readjustment of the device for left hand use and for changing to a different weight instrument on bracket 77 for example, a camera (not shown).

It will be understood that the foregoing examples are by way of illustration only and that various other arrangements also within the scope of the present invention will occur to those skilled in the art upon reading the disclosure set forth hereinbefore.

The invention claimed is:

1. A universal mount for aiming an instrument at a target comprising:
   (a) a base;
   (b) an upstanding support means;
   (c) a fulcrum means located atop said support means;
   (d) arm means extending outwardly from said support means having a seat means to pivotably receive said fulcrum means said arm means further having a first end and a second end and guide means having a guide aperture where said guide means extends outwardly from said arm means;
   (e) bracket means to be slidably received on said arm means including a pair of spaced apart first bracket means extending generally parallel to said arm means on opposite sides of said support and extending outwardly from said first end of said arm means and having first aperture means where said first aperture means are in aligned relation along an axis generally transverse to the longitudinal axis of said support means and located outwardly said first end of said arm means;
   (f) first shaft means to be slidably received in said first aperture of said first bracket means and first shaft stop means to fix said first shaft means with respect to said first bracket means;
   (g) a pair of pivotable connector means connected to said first shaft means a selected distance from the longitudinal axis of said support means means;
   (h) first and second tension bias means each to provide a line of force and connected to said connector means in spaced apart relation to urge said shaft means toward said base means along generally parallel lines of force;
   (i) second shaft means carried by said bracket means and extending generally parallel to said arm means in space d relation therefrom and slidably received by said guide aperture, and stop means to selectively position said second shaft means in said guide means aperture; and
   (j) instrument bracket means to be carried at said second end of said arm means t receive said instrument and suspend said instrument to a side of said arm means opposite said first side.

2. The invention of claim 1 wherein said support means includes shaft means extending generally out of the end of said column means opposite said base means and along the longitudinal axis of said column means and wherein said fulcrum means is a ball carried at the outermost end of said shaft means.

3. The invention of claim 2 wherein said support means is hollow and wherein said shaft means includes plunger means intermediate the ends thereof and including first coiled spring means located between said stop means and the end of said column opposite said base means and second coiled spring means located between said plunger means and said end of said column adjacent said base whereby said shaft is balanced in said column by forces exerted on said plunger means by said first and second springs.

4. The invention of claim 1 wherein said fulcrum means is a ball received in said seat means of said arm means.

5. The invention of claim 1 wherein said first shaft stop means include collar means to be selectively fastened to said first shaft.

6. The invention of claim 1 wherein said base means includes post means to receive said support and is inclined at a selected angle relative to the normal to said base.

7. The invention of claim 1 wherein said pivotable connector means includes a first connector means pivotably connected at a first end to said first shaft and a connector bar pivotably connected at a second end of said first connector means to extend outwardly form opposite sides of said first connector means where said first and second tension bias means are connected to opposite sides of said connector bar.

8. The invention of claim 1 wherein said first and second tension bias means are tension spring means.

9. The invention of claim 8 wherein said spring means include third and fourth springs each having first and second ends and connected at first end to said opposite ends of said connector bar.

10. The invention of claim 9 wherein said column means includes spring retainer means to receive said second ends of said third and fourth spring.

11. The invention of claim 1 wherein said connector means can be shifted from one side of said support means to the opposite side thereof by adjustment of said first shaft when said instrument bracket is moved from said second side of said arm means to said first side of said arm means.

12. The invention of claim 1 wherein said instrument bracket is pivotably secured to said arm means.

13. The invention of claim 1 wherein said base is mounted to a selected surface of a vehicle and including elastomeric vibration absorption means interposed between said base and said vehicle surface.

14. The invention of claim 13 wherein said base means includes base apertures with generally cylindrical elastomeric vibration absorption means extending therethrough and resting on said surface and supporting said base in spaced relation from said surface.

15. The invention of claim 1 including an instrument operators seat located in cooperative proximity to said instrument bracket means to accomodate an instrument operator and provide said operator access to an instrument carried on said instrument bracket means.

16. The invention of claim 15 wherein said seat is padded.

17. The invention of claim 16 wherein said seat includes removable padding and where the padding closest to said instrument bracket is of high compression resistance than padding more remote from said instrument bracket.

* * * * *